(12) United States Patent
Laumen et al.

(10) Patent No.: US 7,412,227 B2
(45) Date of Patent: Aug. 12, 2008

(54) ACCOUNTING OF DATA TRANSMISSION COSTS IN A MOBILE RADIO/TELEPHONE NETWORK

(75) Inventors: Josef Laumen, Hildesheim (DE); Andreas Schmidt, Braunschweig (DE); Gunnar Schmidt, Wolfenbüttel (DE)

(73) Assignee: Siemens Aktiengesellschaft, Munich (DE)

( * ) Notice: Subject to any disclaimer, the term of this patent is extended or adjusted under 35 U.S.C. 154(b) by 479 days.

(21) Appl. No.: 10/381,511

(22) PCT Filed: Aug. 20, 2001

(86) PCT No.: PCT/DE01/03175

§ 371 (c)(1), (2), (4) Date: Mar. 24, 2003

(87) PCT Pub. No.: WO02/25921

PCT Pub. Date: Mar. 28, 2002

(65) Prior Publication Data

US 2004/0121757 A1 Jun. 24, 2004

(30) Foreign Application Priority Data

| Sep. 22, 2000 | (DE) | 100 47 128 |
| Oct. 9, 2000 | (DE) | 100 49 802 |
| Jan. 9, 2001 | (DE) | 101 00 610 |
| Feb. 13, 2001 | (DE) | 011 03 357 |

(51) Int. Cl.
*H04M 11/00* (2006.01)

(52) U.S. Cl. .................. 455/405; 455/406

(58) Field of Classification Search .......... 455/405, 455/406, 407, 408, 466

See application file for complete search history.

(56) References Cited

U.S. PATENT DOCUMENTS

| 6,104,792 A | 8/2000 | Lautenschlager et al. |
| 6,473,622 B1 * | 10/2002 | Meuronen .................. 455/466 |
| 6,496,689 B1 | 12/2002 | Keller et al. |
| 2002/0013854 A1 * | 1/2002 | Eggleston et al. |
| 2004/0049438 A1 | 3/2004 | Laumen et al. |

FOREIGN PATENT DOCUMENTS

| DE | 19606557 | 8/1999 |
| EP | 0 753 957 | 1/1997 |
| EP | 0753957 | 1/1997 |
| WO | WO98/09451 | 3/1998 |
| WO | WO9809451 | 3/1998 |

(Continued)

OTHER PUBLICATIONS

Universal Mobile Telecommunications System (UMTS); Multimedia Messaging Service (MMS), Functional description; Stage 2 (3G TS 23.140 version 3.0.1 Release 1999).

(Continued)

*Primary Examiner*—William J Deane

(57) ABSTRACT

A method is provided for the accounting of data transmission costs in a mobile radio network, in particular text and/or image data with or without sound, such that data which is or will be transmitted is assigned at least one cost signal for the costs of sending one or more replies relating to the transmitted data, and that this or these cost signal(s) are transmitted to the recipient(s) of the data.

25 Claims, 20 Drawing Sheets

| Name | Content | Comments |
|---|---|---|
| X-Mms-Message-Type | m-send-req | Mandatory. Indicates the transaction type. |
| X-Mms-Transaction-ID | A unique code | Mandatory. This Transaction-ID identifies only M-Send.req and the corresponding reply. |
| X-Mms-Mms-Version | Version number | Mandatory. The MMS Version number. |
| Date | Send date | Optional. Arrival time of message at MMS server. The MMS server generates this field if it is not provided by terminals. |
| From | Sender address | Mandatory. This field MUST be present in a message delivered to a recipient. This field CAN be generated by the sender client or CAN be inserted at the MMS server using the Insert Address token. |
| To | Address # 1 | Optional. Addressing is covered in chapter. Any number of address fields is permitted. |
| Cc | Address # 1 | Optional. Addressing is covered in chapter 8. Any number of address fields is permitted. |
| Bcc | Address # 1 | Optional. Addressing is covered in chapter. Any number of address fields is permitted. |
| Subject | Subject of the message | Optional |

FOREIGN PATENT DOCUMENTS

| | | |
|---|---|---|
| WO | WO9856202 | 12/1998 |
| WO | WO 00/41415 | 7/2000 |
| WO | WO0045609 | 8/2000 |
| WO | WO0225922 | 3/2002 |

OTHER PUBLICATIONS

ETSI TS 123 140 V3.0 2000-03 XP0002948986 Universal Mobile Telecommunications System (UMZS); Multimedia Messaging Service (MMS), Functional description, Stage 2 (3G TS 23. 140 version 3.0.1, Release 1999).

GSM 0.340 version 7.4.0 Release 1998, Digital Cellular Telecommunications System, Technical realization of the Short Message Service (SMS).

WAP-209 MMSEncapsulation, Release 2000; Wireless Application Protocol, WAP Multimedia Messaging Service; Message Encapsulation, MMS Proposed SCD 1.0.

WAP 203 WSP, Version 4 May 2000; Wireless Application Protocol, Wireless Session Protocol Specification; Chapter 8.4, "Header Encoding".

* cited by examiner

FIG. 3A

| Name | Content | Comments |
|---|---|---|
| X-Mms-Message-Type | m-send-req | Mandatory. Indicates the transaction type. |
| X-Mms-Transaction-ID | A unique code | Mandatory. This Transaction-ID identifies only M-Send.req and the corresponding reply. |
| X-Mms-Mms-Version | Version number | Mandatory. The MMS Version number. |
| Date | Send date | Optional. Arrival time of message at MMS server. The MMS server generates this field if it is not provided by terminals. |
| From | Sender address | Mandatory. This field MUST be present in a message delivered to a recipient. This field CAN be generated by the sender client or CAN be inserted at the MMS server using the Insert Address token. |
| To | Address # 1 | Optional. Addressing is covered in chapter. Any number of address fields is permitted. |
| Cc | Address # 1 | Optional. Addressing is covered in chapter 8. Any number of address fields is permitted. |
| Bcc | Address # 1 | Optional. Addressing is covered in chapter. Any number of address fields is permitted. |
| Subject | Subject of the message | Optional |

FIG. 3B

| Name | Content | Comments |
|---|---|---|
| X-Mms-Message-Class | Personal / advertising / information /auto | Optional. Auto shows a message which is automatically generated by the client. If the message class is auto, the source terminal MUST NOT request a delivery report or a read report. If the field is missing, the recipient interprets the message as personal. |
| X-Mms-Expiry | Length of time for which the message to be stored on the server or time at which message is to be deleted. | Optional. Default: maximum. The field has two formats: absolute or interval. |
| X-Mms-Delivery-Time | Requested delivery time | Optional. Default: immediate. Shows the earliest possible delivery of the message to the recipient. The field has two formats: absolute or interval. |
| X-Mms-Priority | Low / normal / high | Optional. Default: normal |
| X-Mms-Sender-Visibility | Hide / show | Optional. Default: show the sender's address / telephone number to the recipient if the sender's number / address is not confidential. Hide = do not show addresses. Show = show even confidential addresses. |

FIG. 3C

| Name | Content | Comments |
|---|---|---|
| X-Mms-Delivery-Report | Yes / No | Optional. Default is specified if the service is requested. Indicates whether the user would like a delivery report every recipient. If the message class is auto, the field MUST always be present and the value MUST be no. |
| X-Mms-Read-Reply | Yes / No | Optional. Indicates whether the user would like a read report from every recipient as a new message. If the message class is auto, the field MUST always be present and the value MUST be no. |
| Content-Type | Content-Type code | Mandatory. The type of content of the message. |
| Content-Type | Content-Type code | Mandatory. The type of content of the message. |

FIG. 4A

| Name | Content | Comments |
|---|---|---|
| X-Mms-Message-Type | m-send-req | Mandatory. Indicates the transaction type. |
| X-Mms-Transaction-ID | A unique code | Mandatory. This Transaction-ID identifies only M-Send.req and the corresponding reply. |
| X-Mms-Mms-Version | Version number | Mandatory. The MMS Version number. The version is 1.0 in accordance with this specification. |
| Date | Send Date | Optional. Arrival time of message at MMS server. The MMS server generates this field if it is not provided by terminals. |
| From | Sender address | Mandatory. This field MUST be present in a message delivered to a recipient. This field CAN be generated by the sender client or CAN be inserted at the MMS server using the Insert-Address token. |
| To | Address #1 | Optional. Addressing is covered in chapter. Any number of address fields is permitted. |
| Cc | Address #1 | Optional. Addressing is covered in chapter 8. Any number of address fields is permitted. |
| Bcc | Address #1 | Optional. Addressing is covered in chapter. Any number of address fields is permitted. |
| Subject | Subject of the message | Optional |

FIG. 4B

| Name | Content | Comments |
|---|---|---|
| X-Mms-Message-Class | Personal / advertising / information / auto | Optional. Auto shows a message which is automatically generated by the client. If the message class is auto, the source terminal MUST NOT request a delivery report a read report. If the field is missing, the recipient interprets the message as personal. |
| X-Mms-REF-To-Amount | Number of free replies | Optional. Number of free replies for recipients in the To field. |
| X-Mms-REF-Cc-Amount | Number of free replies | Optional. Number of free replies for recipients in the Cc field. |
| X-Mms-REF-Bcc-Amount | Number of free replies | Optional. Number of free replies for recipients in the Bcc field. |
| X-Mms-Reply-ID | ID | Optional. This ID must be present if an MM is a reply to a first MM. This ID should be identical to the ID 1 of the original (first) MM to which the reply is being sent. |
| X-Mms-Expiry | Length of time for which the message is to be stored on the server or time at which message is to be deleted. Likewise shows: Time period for the reply for free service | Optional. Default: maximum. The field has two formats: absolute or interval. |

17 — X-Mms-Message-Class
18 — X-Mms-REF-To-Amount
19 — X-Mms-REF-Cc-Amount
20 — X-Mms-REF-Bcc-Amount
21 — X-Mms-Reply-ID / X-Mms-Expiry

FIG. 4C

| Name | Content | Comments |
|---|---|---|
| X-Mms-Delivery-Time | Requested delivery time | Optional. Default: immediate. Shows the earliest possible delivery of the message to the recipient. The field has two formats: absolute or interval. |
| X-Mms-Priority | Low / normal / high | Optional. Default: normal |
| X-Mms-Sender-Visibility | Hide / show | Optional. Default: show the sender's address / telephone number to the recipient if the sender's number / address is not confidential. Hide = do not show addresses. Show = show even confidential addresses. |
| X-Mms-Delivery-Report | Yes / No | Optional. Default is specified if the service is requested. Indicates whether the user would like a delivery report every recipient. If the message class is auto, the field MUST always be present and the value MUST be no. |
| X-Mms-Read-Reply | Yes / No | Optional. Indicates whether the user would like a read report from every recipient as a new message. If the message class is auto, the field MUST always be present and the value MUST be no. |
| Content-Type | Content-Type code | Mandatory. The type of content of the message. |
| Content-Type | Content-Type code | Mandatory. The type of content of the message. |

FIG. 5

| Name | Content | Comments |
|---|---|---|
| X-Mms-Message-Type | m-send-conf | Mandatory. Indicates the transaction type. |
| X-Mms-Transaction-ID | A unique code | Mandatory. This Transaction-ID identifies only M-Send.conf and the corresponding reply. |
| X-Mms-Mms-Version | Version number | Mandatory. The MMS Version number. The version is 1.0 in accordance with this specification. |
| X-Mms-Response-Status | Status code | Mandatory. MMS-specific status |
| Message-ID | ID | Optional. This is a unique reference which is assigned to the message. This ID MUST always be present if the MMS server has accepted the message. As a result of the ID, a client can match delivery reports with previously sent messages. |

FIG. 6

| Name | Content | Comments |
|---|---|---|
| X-Mms-Message-Type | m-send-conf | Mandatory. Indicates the transaction type. |
| X-Mms-Transaction-ID | A unique code | Mandatory. This Transaction-ID identifies only M-Send.conf and the corresponding reply. |
| X-Mms-Mms-Version | Version number | Mandatory. The MMS Version number. The version is 1.0 in accordance with this specification. |
| X-Mms-REF-To-Amount (17) | Number of free replies | Optional. Number of free replies for recipients in the To field. |
| X-Mms-REF-Cc-Amount (18) | Number of free replies | Optional. Number of free replies for recipients in the Cc field. |
| X-Mms-REF-Bcc-Amount (19) | Number of free replies | Optional. Number of free replies for recipients in the Bcc field. |
| X-Mms-Changing-Amount (20) | Charge | Optional. |
| X-Mms-Response-Status | Status code | Optional. MMS-specific status |
| Message-ID | ID | Optional. This is a unique reference which is assigned to the message. This ID MUST always be present if the MMS server has accepted the message. As a result of the ID, a client can match delivery reports with previously sent messages. |

FIG. 7

| Name | Content | Comments |
|---|---|---|
| X-Mms-Message-Type | m-notification-ind | Mandatory. Indicates the transaction type. |
| X-Mms-Transaction-ID | A unique code | Mandatory. Identifies the notification and the subsequent transaction which was inferred from the following M-NotifyResp. |
| X-Mms-Mms-Version | Version number | Mandatory. The MMS Version number. The version is 1.0 in accordance with this specification. |
| From | Sender address | Optional. If hiding the address of the sender from the recipient is supported, the MMS server does not add this field to a message header. |
| X-Mms-Message-Class | Personal / advertising / information / auto | Mandatory. |
| X-Mms-Message-Size | Size of the message | Mandatory. Overall size of the message in bytes. |
| X-Mms-Expiry | Time period during which the message is available. | Mandatory. This field has only one format: interval. |
| X-Mms-Content-Location | URI | Mandatory. This field defines where the message is stored. |

FIG. 8A

| Name | Content | Comments |
|---|---|---|
| X-Mms-Message-Type | m-send-req | Mandatory. Indicates the transaction type. |
| X-Mms-Transaction-ID | A unique code | Mandatory. Identifies the notification and the subsequent transaction which was inferred from the following M-NotifyResp. |
| X-Mms-Mms-Version | Version number | Mandatory. The MMS Version number. The version is 1.0 in accordance with this specification. |
| From | Sender address | Optional. If hiding the address of the sender from the recipient is supported, the MMS server does not add this field to a message header. |
| X-Mms-REF-To-Amount (17) | Number of free replies | Optional. Number of free replies for recipients in the To field. |
| X-Mms-REF-Cc-Amount (18) | Number of free replies | Optional. Number of free replies for recipients in the Cc field. |
| X-Mms-REF-Bcc-Amount (19) | Number of free replies | Optional. Number of free replies for recipients in the Bcc field. |
| X-Mms-Reply-ID (20) | ID | Optional. This ID must be present if an MM is a reply to a first MM. This ID should be identical to the ID 1 of the original (first) MM to which the reply is being sent. |
| X-Mms-Expiry (21) | Time period until end of the free reply option | Optional. Default: maximum. The field has two formats: absolute or interval. |

FIG. 8B

| Name | Content | Comments |
|---|---|---|
| X-Mms-Message-Class | Personal / advertising / information / auto | Mandatory. |
| X-Mms-Message-Size | Size of the message | Mandatory. Overall size of the message in bytes. |
| X-Mms-Expiry | Time period during which the message is available. | Mandatory. This field has only one format: interval. |
| X-MX-Mms-Content-Location | URI | Mandatory. This field defines where the message is stored. |

FIG. 9A

| Name | Content | Comments |
|---|---|---|
| X-Mms-Message-Type | m-retrieve-conf | Mandatory. Indicates the transaction type. |
| X-Mms-Transaction-ID | A unique code | Mandatory. Identifies the notification and the subsequent transaction which was inferred from the following M-NotifyResp. |
| Message-ID | ID | Optional. This is a unique reference which is assigned to the message. This ID MUST always be present if the original client has requested a read reply. As a result of the ID, a client can match delivery reports with previously sent messages. |
| X-Mms-Mms-Version | Version number | Mandatory. The MMS Version number. The version is 1.0 in accordance with this specification. |
| Date | Send Date | Mandatory. |
| From | Sender address | Optional. If hiding the address of the sender from the recipient is supported, the MMS server does not add this field to a message header. |
| To | Address #1 | Optional. Addressing is covered in chapter. Any number of address fields is permitted. |
| Cc | Address #1 | Optional. Addressing is covered in chapter. Any number of address fields is permitted. |

FIG. 9B

| Name | Content | Comments |
|---|---|---|
| Subject | Subject of the message | Optional |
| X-Mms-Message-Class | Personal / advertising / information /auto | Optional. If the field is missing, the recipient interprets the message as personal. |
| X-Mms-Priority | Low / normal / high | Optional. Default: normal |
| X-Mms-Delivery-Report | Yes / No | Optional. Default : No. Indicates whether the user would like a delivery report from every recipient as a new message. |
| X-Mms-Read-Reply | Yes / No | Optional. Default : No. Indicates whether the user would like a read report from every recipient as a new message. |
| Content-type | Content-type code | Mandatory. The type of content of the message. |

FIG. 10A

| Name | Content | Comments |
|---|---|---|
| X-Mms-Message-Type | m-retrieve-conf | Mandatory. Indicates the transaction type. |
| X-Mms-Transaction-ID | A unique code | Mandatory. Identifies either the transaction which was started by M-Notification without M-NotifyResp, or a new transaction if a deferred delivery was requested. The ID of the new transaction is optional. |
| Message-ID | ID | Optional. This is a unique reference which is assigned to the message. This ID MUST always be present if the original client has requested a read reply. As a result of the ID, a client can compare read reports with previously sent messages. |
| X-Mms-Mms-Version | Version number | Mandatory. The MMS Version number. The version is 1.0 in accordance with this specification. |
| Date | Send Date | Mandatory. |
| From | Sender address | Optional. If hiding the address of the sender from the recipient is supported, the MMS server does not add this field to a message header. |
| To | Address #1 | Optional. Addressing is covered in chapter. Any number of address fields is permitted. |

FIG. 10B

| Name | Content | Comments |
|---|---|---|
| Cc | Address #1 | Optional. Addressing is covered in chapter. Any number of address fields is permitted. |
| Subject | Subject of the message | Optional |
| X-Mms-REF-To-Amount | Number of free replies | Optional. Number of free replies for recipients in the To field. |
| X-Mms-REF-Cc-Amount | Number of free replies | Optional. Number of free replies for recipients in the Cc field. |
| X-Mms-REF-Bcc-Amount | Number of free replies | Optional. Number of free replies for recipients in the Bcc field. |
| X-Mms-Reply-ID | ID | Optional. This ID must be present if an MM is a reply to a first MM. This ID should be identical to the ID 1 of the original (first) MM to which the reply is being sent. |
| X-Mms-Message-Class | Personal / advertising / information / auto | If the field is missing, the recipient interprets the message as personal. |
| X-Mms-Priority | Low / normal / high | Optional. Default: normal |
| X-Mms-Delivery-Report | Yes / No | Optional. Default : No . Indicates whether the user would like a delivery report from every recipient as a new message. |
| X-Mms-Read-Reply | Yes / No | Optional. Default : No . Indicates whether the user would like a read report from every recipient as a new message. |
| Content-type | Content-type code | Mandatory. The type of content of the message. |

Rows annotated: 17 → X-Mms-REF-To-Amount, 18 → X-Mms-REF-Cc-Amount, 19 → X-Mms-REF-Bcc-Amount, 20 → X-Mms-Reply-ID

FIG. 11

*X-Mms-Reply-ID (0x1B):*
Reply-ID-value= Text string

*X-Mms-RFF-To-Amount (0x1C):*
RFF-To-Amount-Value= short integer

*X-Mms-RFF-Cc-Amount (0x1D):*
RFF-Cc-Amount-Value= short integer

*X-Mms-RFF-Bcc-Amount (0x1E):*
RFF-Bcc-Amount-Value= short integer

FIG. 12

| Name | Assigned number | Sequential number | Comment |
|---|---|---|---|
| Bcc | 0X01 | 1 | Unchanged from the prior art |
| Cc | 0X02 | 2 | |
| X-Mms-Content-Location | 0X03 | 3 | |
| Content Type | 0X04 | 4 | |
| Date | 0X05 | 5 | |
| X-Mms-Delivery-Report | 0X06 | 6 | |
| X-Mms-Delivery-Time | 0X07 | 7 | |
| X-Mms-Expiry | 0X08 | 8 | |
| From | 0X09 | 9 | |
| X-Mms-Message-Class | 0X0A | 10 | |
| Message-ID | 0X0B | 11 | |
| X-Mms-Message-Type | 0X0C | 12 | |
| X-Mms-Version | 0X0D | 13 | |
| X-Mms-Message-Size | 0X0E | 14 | |
| X-Mms-Priority | 0X0F | 15 | |
| X-Mms-Read-Reply | 0X10 | 16 | |
| X-Mms-Report-Allowed | 0X11 | 17 | |
| X-Mms-Response-Status | 0X12 | 18 | |
| X-Mms-Sender-Visibility | 0X13 | 19 | |
| X-Mms-Status | 0X14 | 20 | |
| Subject | 0X15 | 21 | |
| To | 0X16 | 22 | |
| X-Mms-Transaction-ID | 0X17 | 23 | |
| ... | ... | ... | |
| X-Mms-Charging-Amount | 0X1A | 26 | Newly inserted in accordance with the invention |
| X-Mms-Reply-ID | 0X1B | 27 | |
| X-Mms-RFF-To-Amount | 0X1C | 28 | |
| X-Mms-RFF-Cc-Amount | 0X1D | 29 | |
| X-Mms-RFF-Bcc-Amount | 0X1E | 30 | |

ACCOUNTING OF DATA TRANSMISSION COSTS IN A MOBILE RADIO/TELEPHONE NETWORK

BACKGROUND OF THE INVENTION

Existing mobile radio networks, such as the network which operates in accordance with the GSM standard, offer only limited possibilities for transmitting non-spoken messages such as text data. For example, short messages having a maximum of 160 characters can be transmitted as texts. This arrangement is designated SMS (Short Message Service). The data sender has to pay for the cost of sending such text messages.

A charging method is disclosed in EP 0 753 957 A2 in which a GSM user as sender sends an SMS message to an Internet user as recipient. In the text field (i.e., in the user data) of the transmitted SMS message, the GSM user can also insert a reply stamp at his/her cost. If the recipient inserts this stamp in an SMS reply to the original sender in the reply text, this reply remains free of cost to him/her.

WO 00/41415 merely relates to a coordination procedure for obtaining replies from mobile radio device users in response to an inquiry via SMS messages. In this case, the respective answering mobile radio device user is, if appropriate, not charged for his/her SMS reply.

A corresponding coordination procedure is also provided by WO 98/09451 on the basis of SMS, in which a credit is made to the account of the person queried for returning a reply; e.g., to a survey to the sender of the latter.

A transmission of multimedia data, in particular still or moving images with or without sound, also will be possible in the future. A considerable increase in the data transmission volumes within such transmissions is expected, as is a considerable increase in the number of messages to be transmitted, together resulting in an increase in costs.

A transmission service for multimedia data is, for example, the so-called Multimedia Messaging Service (MMS) in the UMTS (Universal Mobile Telecommunication Service) radio communication system. Details of this can be found in the specification ETSI TS 123 140 V3.0.1 Universal Mobile Telecommunications System (UMTS); Multimedia Messaging Service (MMS), Functional description; stage 2 (e G TS 23.140 version 3.0.1 Release 1999).

The present invention addresses the problem of simplifying the control and manipulation of costs for subscribers to a mobile radio network.

SUMMARY OF THE INVENTION

Using the method in accordance with the present invention, it is possible for a data recipient to answer received data free of charge. This allows the data sender, for example, to conduct surveys which would have previously required the responder to assume the cost of reply messages in each case, thus resulting in a low response rate. In accordance with the present invention, the recipient can be certain that the recipient's reply is free of charge, thereby making it easier for the recipient to control costs.

If the cost signal from the sender can be set, then the sender can select, also on a case by case basis, whether the sender wishes to assume the costs of one or even a number of possible reply messages.

In one embodiment of the present invention, the service provider informs the sender of what costs the sender can expect if the reply costs are assumed; in the form of a minimum or a maximum, for example. This value can be calculated by the service provider and can be dependent, for example, on how many recipients data is transmitted to.

It is particularly advantageous that the data sender can specify a time period within which the reply must be made in order for the assumption of costs still to apply. As such, the data sender can specifically set a limit to the possible costs, without the individual recipient being uncertain whether the recipient's reply in each case is still covered by the assumption of costs. The permitted number of replies from a given recipient also can be limited for the same purpose.

A particularly effective possibility of cost management is derived if the data sender divides the possible recipients into groups and then assigns each of these groups specific parameters for the assumption of reply costs. It is then possible, for example, to assign different assumption-of-cost conditions to established customers and new customers; for example, by extending the cost-free reply time for established customers.

All in all, therefore, it is possible to allow an assumption of costs relating to the responses of the recipient, which assumption of costs is precisely controllable by the sender and is, therefore, also suitable for bulk transmissions such as TED surveys or sales via telemarketing.

Additional features and advantages of the present invention are described in, and will be apparent from, the following Detailed Description of the Invention and the Figures.

BRIEF DESCRIPTION OF THE FIGURES

FIG. 3 shows the M-send.req message in accordance with the WAP protocol.

FIG. 4 shows the M-send.req message with the addition of a cost signal in accordance with the present invention (highlighted in gray).

FIG. 5 shows the M-send.conf message in accordance with the WAP protocol.

FIG. 6 shows the M-send.conf message with the addition of a cost signal in accordance with the present invention (highlighted in gray).

FIG. 7 shows the M-Notification.ind message in accordance with the WAP protocol.

FIG. 8 shows the M-Notification.ind message with the addition of a cost signal in accordance with the present invention (highlighted in gray).

FIG. 9 shows the M-Retrieve.conf message in accordance with the WAP protocol.

FIG. 10 shows the M-Retrieve.conf message with the addition of a cost signal in accordance with the present invention (highlighted in gray).

FIG. 11 shows the setting (encoding) of fields for the cost signal in accordance with the preceding figures.

FIG. 12 shows the addressing of the additional header fields in accordance with the present invention.

DETAILED DESCRIPTION OF THE INVENTION

In the exemplary embodiment, the application of the present invention is described in relation to a data transmission model 1 for the WAP standard, as it will be used in the transmission of particularly image data and formatted text data in the UMTS standard (Universal Mobile Telecommunication Standard). It is understood that the present invention also can be transferred to other standards.

In the UMTS standard, in addition to the existing SMS (Short Message Service), provision is made to include a so-called MMS (Multimedia Messaging Service) for the transmission of non-spoken messages. It is, therefore, possible also to transmit formatted texts and images. The restriction which exists in SMS to a message length of 160 characters does not apply. A transmission of audio and video messages is possible.

Figure 1:
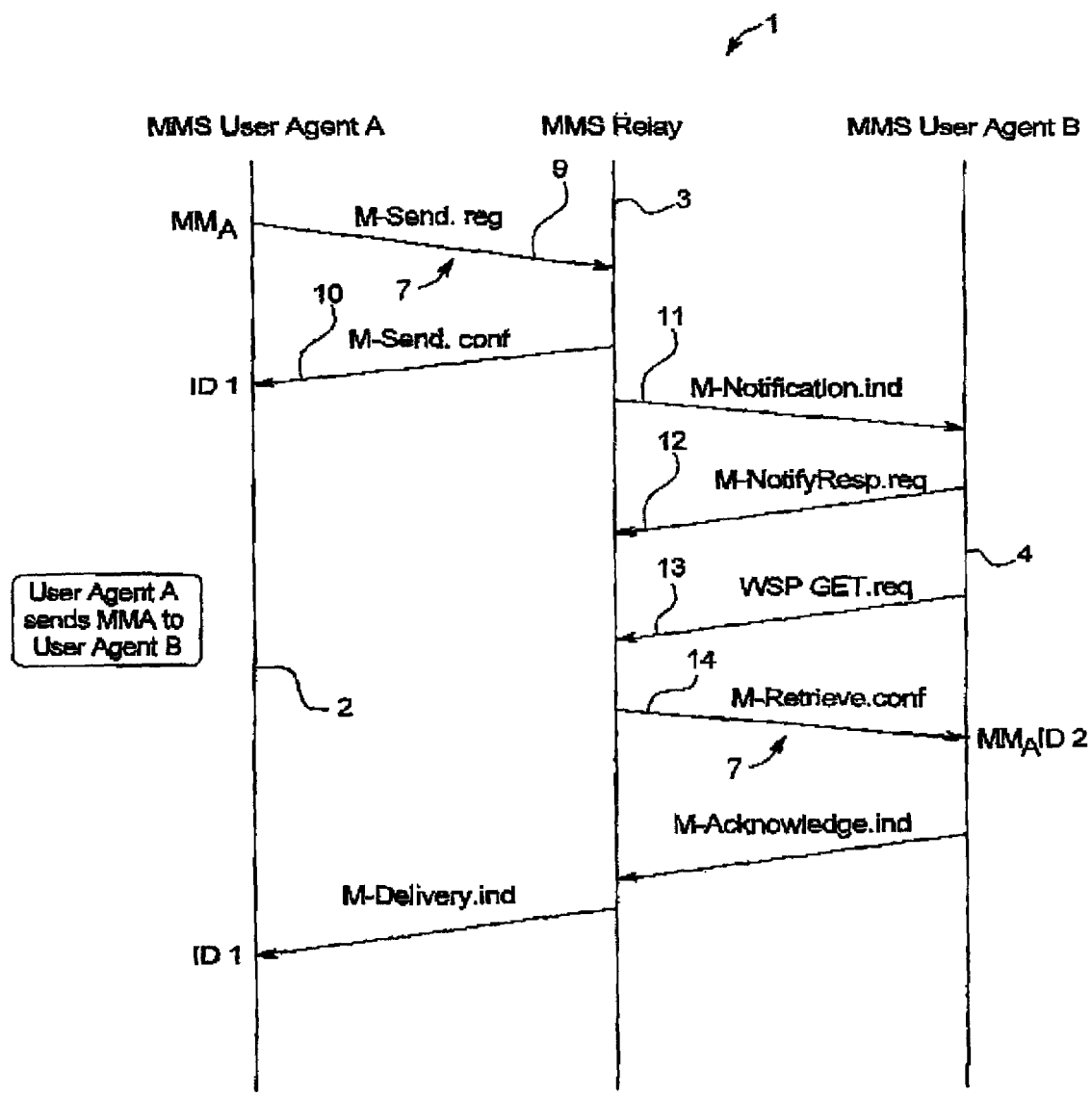
FIG. 1 shows a schematic diagram of messages, which are assigned to a data transmission in accordance with the WAP standard (wireless application protocol), between the level of the sender and that of the provider on one side and the level of the provider and that of the recipient on the other side.
Figure 2:
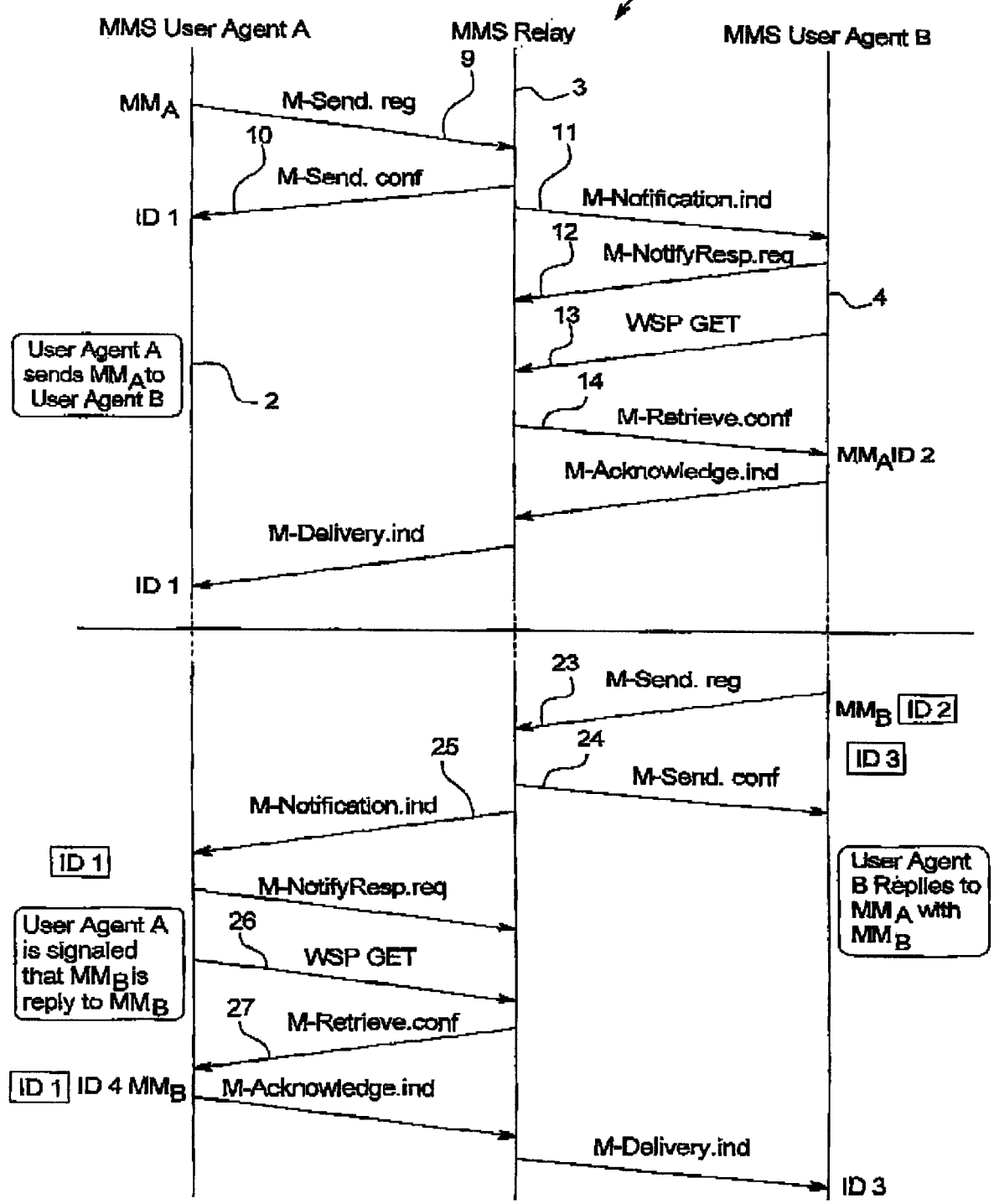
FIG. 2 shows a similar diagram to FIG. 1, with the addition of a reply from the original recipient in response to the data transmission.
Figure 13:
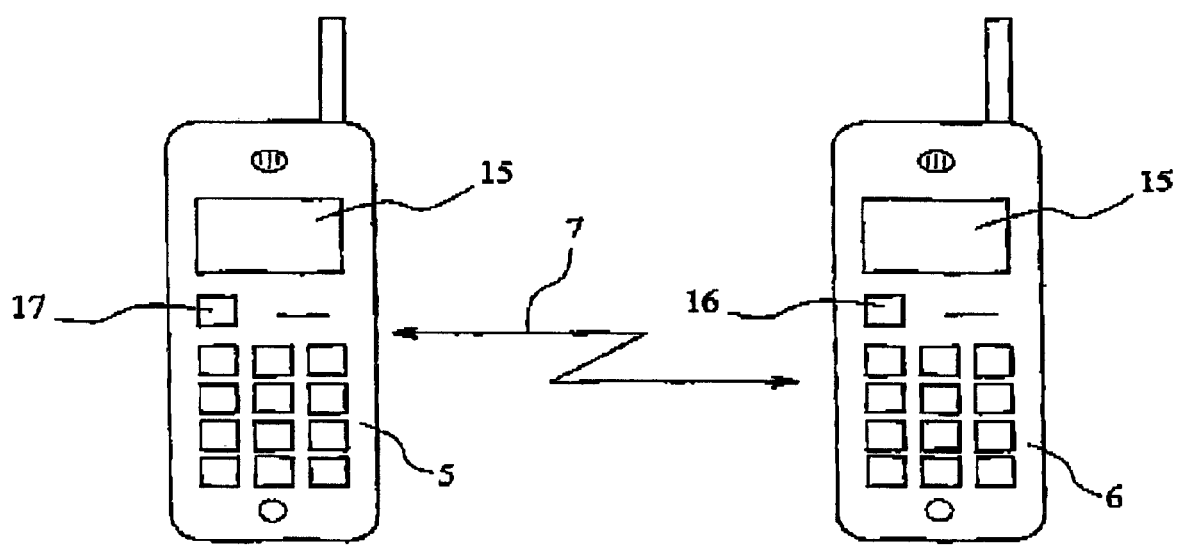
FIG. 13 shows a schematic representation of the data transmission using mobile telecommunication devices in accordance with the present invention.

MMS can be implemented using WAP. In this case, for the radio transmission of data such as multimedia messages (MMs), the protocol model (WAP WSP: Wireless Session Protocol) is applied as shown in FIG. 1 for a one-sided data transmission and as shown in FIG. 2 when adding the transfer of a reply. This includes a level 2 of a data sender (MMS user agent A), a level 3 of a provider (MMS relay) and a level 4 of a recipient (MMS user agent B). The level 2 of the data sender includes at least one telecommunication device 5, and the level 4 of the recipient likewise includes a telecommunication device 6. These telecommunication devices 5,6 can be designed as normal mobile phones, for example, or as devices with additional input or display functions, such as laptops.

A data record 7 which is written in the telecommunication device 5 of the sender, or which is to be relayed by the device, is initially sent as a message 9 (this message has the name M-Send.req in the WAP protocol and is shown in FIG. 3 in its development without the extension in accordance with the present invention) to the provider (level 3).

From there, the received message is acknowledged with the return message 10 (designated M-send.conf in the WAP standard and shown in its existing configuration in FIG. 5) to the sender (level 2).

Subsequently, the provider 3 sends the information 11 (M-Notification.ind, FIG. 7) to the recipient (level 4), who is thus notified that a message for the recipient is available at the provider 3 for downloading.

In response to this, the provider 3 receives (for example, automatically), the acknowledgment message 12 (M-Notify-Resp.req) from the telecommunication device 6 of the recipient (level 4).

Only at the request of the recipient using the message 13 (WSP GET.req) does the provider 3 forward the data record 7 with the message 14 (M-retrieve.conf, FIG. 9) to the recipient (level 4).

The so-called header fields are used for managing, the messages 9, 10, 11, 12, 14, and precede the actual data record 7, and contain information about the origin, send time, file size and other details.

In accordance with the present invention, the number of header fields is increased in order that at least one further field can be used as an information and control field and can contain a cost signal to indicate the readiness to assume costs of the return of a reply (FIG. 2) from the recipient 4 back to the original data sender 2.

In the exemplary embodiment, the header fields designated with the reference numerals 17, 18, 19, 20 are assigned 0x1B to 0x1E for this purpose (FIG. 12). In this case, the fields 0x1C to 0x1E contain information about different assumptions of cost (see below) adapted to recipient groups in each case, and the field 0x1B contains an identification signal for the reply so that the reply can be assigned to a previously received data record 7. The field 0x1A designated 22 contains information about the costs to be expected (see below).

The sender (level 2) can activate a switch or similar input 16 on the sender's telecommunication device, the switch or similar input being either hardware-based or software-based and operated via the keyboard which is present in any case, in order to set the assumption of costs of one or more replies. Alternatively, the service provider 3 also can implement the setting on the basis of an agreement which can be updated in advance of data messages, for example.

In the absence of a special (fixed-term) agreement with the service provider 3, the request 9 (M-send.req) seeking transmission of data 7 must also transmit the information, from the sender 2 to the service provider 3, that and if applicable to what extent the sender 2 will accept an assumption of the costs of an answer to the data to be sent. For this purpose, the header fields 17, 18, 19, 20 are included as a new element of the request 9 (FIG. 4), whereby the number of header fields is increased in comparison with the prior art (FIG. 3). Integer variables (FIG. 11) are stored in the fields 17, 18, 19 which, by way of example, are addressed with 0x1B, 0x1C and 0x1D (decimal 28, 29, 30) and are given the field names "X-Mms-RFF-To-Amount", "X-Mms-RFF-Cc-Amount" and "X-Mms-RFF-Bcc-Amount". For each of three groups of recipients, specifically the "To" group (direct recipients), the "Cc" group ("carbon copy": receive copy with the knowledge of other recipients) and the "Bcc" group ("blind carbon copy": receive copy without the knowledge of other recipient or recipients), these integer variables define the number of reply messages from recipients 4 in each of these groups for which the original sender 2 assumes the costs. The values can vary from each other for the different groups, thus providing the advantages cited above. The setting of only one reply with assumed costs is also possible. If the integer variable includes one octet, for example, a maximum of 256 free replies is possible. A different or more complex segmentation is possible instead of the group segmentation shown here.

It is also possible to extend the field 21 (X-Mms-Expiry) which already exists, such that the maximum storage time contained therein for a message in the server of the provider 3 is now defined as a maximum time period (deadline) for the assumption of costs and, therefore, that such replies that are sent after the expiration of this time period shall no longer be payable by the sender 2 of the original data.

The field 20 gives an identification signal for recognizing the reply, so that the reply can be assigned to the correct data record 7. Thus, not all of the incoming messages to the original sender 2 during the follow-up time are received in the "Reply for free" category, thereby incurring costs for the original sender 2.

It is understood that further fields are also possible in addition to the selection of fields shown here; for example, fields that specify a cost fraction if the reply costs are not to be borne fully by the sender 2 of the original data. It is also possible to specify, for example, that the costs will be assumed until the expiration of the time period stored in field 21, and subsequently only assumed in part or subject to an upper limit. It is likewise possible to select the type of reply for which costs will be assumed; for example, for text messages only but not for image or audio data.

In its acknowledgment message 10 (M-Send.conf: FIG. 5, with extensions in accordance with the invention: FIG. 6), the service provider 3 can fully or partially accept the readiness of the sender 2 to assume the costs To this end, it sets the fields 17, 18, 19 also contained in the message 10, for the respective group in each case, either to the values proposed by the sender 2 in the case of full acceptance or to smaller values in the case of partial acceptance. The acknowledgment message 10 can also contain a field 22 (not shown), addressed with 0x1A (decimal: 26) for example, in which is stored information prepared by the service provider (level 3) concerning the level of costs to be expected. This information is dependent on the permitted number of replies and the specified time duration. It also may be dependent on the data type to be permitted in the reply.

If agreeable to the desired assumption of costs by the sender 2, the service provider 3 in its message 11 (M-notification.ind: FIG. 8) to the recipient 4 leaves the fields 17, 18, 19 at the values set by the sender 2, and communicates the values to the recipient(s) 4 in accordance with the group in which the recipient 4 is to be addressed. The recipient, therefore, receives the message that a data record 7 is available for the recipient for downloading, in response to which the recipient may, in a specific way or within a specific time, send a predetermined number of replies free of charge to the original sender 2. This information can be communicated to the recipient visually (via the indicator 15, such as the display) or acoustically.

The identification signal in the field 20, which is addressed with 0x1B (decimal: 27) and has the field name X-Mms-Reply-ID, is contained in a reply merely to allow a unique identification signal ID2 for assigning to an original data record. The original message 7 is already uniquely identified with its ID1 via another header field in accordance with the prior art, and therefore does not require the additional field 20. After notification via the message 11 that a data record 7 is available for downloading, the recipient 4 can decide whether to download the data record 7 from the level 3 of the service provider into the reception level 4 of the recipient; i.e., into the memory of the recipient's telecommunication device 6. If the recipient decides to do so, then the recipient will send the message 13 (WSP GET.req) back to the provider.

The service provider 3 will thereupon forward the data transmission 14 (M-Retrieve.conf) to the recipient 4. Otherwise, a download of the data record 7 (transfer of the message 14 to the recipient 4) is not enabled. It is also possible that the recipient 4 does not want to receive the conveyed message until a later time. Like the message 11, the message 14 can contain the newly inserted fields 17, 18, 19 (FIG. 10). Therefore, the cost information about the free replies is not only supplied in the notification about an available message, but also when the data record 7 is "delivered" and, therefore, also can be stored or printed, for example.

However, the field 20 for assigning is only contained in a reply, since the data record 7 is already uniquely identified (ID1).

In accordance with the present invention, for example, customers intending to place an order can be relieved of associated costs. Additionally, for example, parents can transmit a message to their child, without the child having to pay for the requested reply. This is of particular importance if the communication must be paid for directly, via cards, for example, the value of which is decreased. Thus, it is still possible to answer data 7 in the "Reply for free" method when cards have too little remaining value.

As indicated above, the reply message (FIG. 2) then also contains the field 20, which is addressed with 0x1B (decimal: 27) and has the field name X-Mms-Reply-ID. The identity information ID2 stored therein can correspond to the identification signal ID1 of the transmitted data 7 if the assumption of costs applies to the reply concerned, in which case both transmitted data 7 and returned reply contain the same identification signal, whereby it is obvious that they have been correctly assigned to each other. The reply can be identified in the same way, irrespective of whether the information relating to the assumption of costs of one or more replies was contained in the message 11 (M-notify.ind) and/or in the message 14 (M-retrieve.conf).

The proposed method can be integrated in software for operating the communication standard in each case; for example, UMTS. The telecommunication devices 5,6 are then provided with corresponding software.

In order to be capable of implementing the "Reply for free" accounting model, the MMS relay 3 must be able to carry out the following processing steps:

a) From the header fields of the WAP message 9 (M-Send.req), in which the number of cost-free reply MMs is encoded for the individual recipient groups, the required field values for the different recipient groups must be read out for the WAP messages 11 (M-Notification.ind) and 14 (M-Retrieve.conf) and modified or confirmed in accordance with the specifications of the service provider 3.

b) If the identity signals of the transferred data 7 (ID 1) and the reply (ID 2) are different, then the MMS relay 3 must be able definitively to map these signals onto each other and to monitor or modify the field 20 (X-MMS-Reply-ID) accordingly.

c) After the reply has been sent via the WAP message 23 (M-send.req) from the recipient 4 (MMS user agent B) to the MMS relay 3, the MMS relay 3 must check, on the basis of the individual identification signals, whether the reply multimedia message ($MM_B$) is actually a reply to the transmitted data 7 ($MM_A$) and whether the specified time period has been adhered to.

The following examines in detail the header fields used in the WAP messages. In this case, the following scenario is assumed by way of example: MMS user agent A (sender 2) sends an $MM_A$ 7 having a text and a JPEG image to three recipients 4 (one "To" recipient and two "cc" recipients). The sender 2 wants to assume the costs of three reply MMs (multimedia messages) in the case of the "To" recipient group, but for only two reply MMs (multimedia messages) in the case of the "Cc" recipient group. However, the MMS service provider 3 allows only one cost-free reply MM for the "Cc recipient". The time limit for the assumption of the costs is specified as one hour (=3600 seconds):

Message 9: M-Send.reg (MMS User Agent A—MMS Relay 3):

X-Mms-Message-Type: m-send-req
X-Mms-Transaction-ID: 10
X-Mms-Version: 1.0
Date: Wed, 13 Sep. 2000 12:12:19 +0100
From: andreas.schmidt@sal.siemens.de
To: joseff.laumen@sal.siemens.de
Cc: gunnar.schmidt@sal.siemens.de
Bcc: Recipient3@sal.siemens.de;   Recipient4@sal.siemens.de X-Mms-RFF-To-Amount: 3
X-Mms-RFF-To-Amount: 2
X-Mms-RFF-To-Amount: 1
X-Mms-Expiry: 3600

Subject: multimedia message i
Content-Type: multipart/related;   boundary="------
__=__NextPart__000__"
------__=__NextPart__000__
Content-Type: text/plain;
    name="meeting.txt"
Content-Transfer-Encoding: quoted-printable
Dear Colleagues, -continued

```
A meeting has been scheduled at short notice for tomor-
row morning at 8 o'clock.
The agenda is attached. Please reply asap.
URGENT !!!
Regards, Andreas
------_=_NextPart_000_
Content-Type: image/jpeg; name="agenda.jpg"
Content-Transfer-Encoding: base64
Content-ID: <1725782>
...
------_=_NextPart_000_--
```

The sender 2 (MMS user agent A) having the address "an-dreas.schmidt@sal.siemens.de" sends an $MM_{A\,7}$, including a text (MIME content type "plain/text") and a JPEG image (MIME content type "image/jpeg") to the recipient 4 (MMS user agent B) having the address "josef.laumen@sal.siemens.de". A carbon copy ("cc") of this $MM_{A\,7}$ goes to a further recipient 4; namely, the user having the address gunnar.schmidt@sal.siemens.de. Two further blind carbon copies are to be transmitted to the MMS users listed under Bcc as further recipients 4. The WAP message 9 (M-Send.req) contains the Transaction-ID 10, for example. The sender is prepared to assume the costs of three reply MMs from the user having the address "josef.laumen@sal.siemens.de" (MMS user agent B, "To" field). The sender also wishes to assume the costs of two reply MMs from the user "gunnar.schmidt@sal.siemens.de" ("Cc" field) and one reply MM from each of the other two "Bcc" recipients. This information is contained in the gray-highlighted fields 17 (X-Mms-RFF-To-Amount), 18 (X-Mms-RFF-Cc-Amount) and 19 (X-Mms-RFF-Bcc-Amount). The time period for the cost-free answering of the $MM_A$ (3600 seconds) was written in the field 21 (X-Mms-Expiry).

As a result, the sender 2 receives the message 10 (M-Send.conf) from the MMS relay 3, the message having been modified as shown below:

Message 10: M-Send.conf (MMS Relay→MMS User Agent A):

```
X-Mms-Message-Type: m-send-conf
X-Mms-Transaction-ID: 10
X-Mms-Version: 1.0
X-Mms-Response-Status: ok
Message-ID: AAAA.1111@mms-relay.siemens.de X-Mms-RFF-To-Amount: 3
X-Mms-RFF-Cc-Amount: 1
X-Mms-RFF-Bcc-Amount: 0

X-Mms-charging-Amount: "This service costs DM 5.00."
```

Via this message 10, the MMS relay 3 confirms that the WAP message 9 has been transmitted to the MMS relay 3 without error. The Transaction-ID is used as an identification signal, in order uniquely to assign the message 10 at the sender 2 to the associated M-Send.req 9 and hence to the sent MMA 7. In this example, the MMS relay 3 has assigned the identification signal "AAAA.1111@mms-relay.siemens.de" to the $MM_A$ 7. It was written to the field 20 and corresponds to the ID 1 in accordance with the prior art.

As described above, the fields 17 (X-Mms-RFF-To-Amount), 18 (X-Mms-RFF-Cc-Amount) and 19 (X-Mms-RFF-Bcc-Amount) in the message 10 contain the information whether the service provider 3 supports this service and accepts the wishes of the sender 2. In the example shown, this is the case only for the number of reply MMs of the "To" recipient. In the case of the "Cc recipient", two replies with costs assumed by the original sender 2 were requested, but the service provider 3 allows only one, perhaps because the sender 2 is not considered to be an adequately solvent customer. In the case of both the "Bcc recipients", one reply with assumed costs was requested, but the service provider 3 allows none. In this example, the field X-Mms-Charging-Amount shows the costs which might be incurred by the sender of the $MM_A$ 7 as a result of sending it and of the reply MMs which are returned.

Message 11: M-Notification.ind (MMS Relay 3→MMS User Agent B 4):

In this example, there is a notification for each of the four recipients 4: one to the "To recipient" and one each to the "Cc recipient" and the two "Bcc recipients". Each receives a separate Transaction-ID. The information about the time period is contained in each case in the field 21 (X-Mms-Expiry), and the information about the storage location of the MMA 7 is contained in each case in the field X-Mms-Content-Location.

a) Message 11: M-Notification.ind to the "To Recipient":

```
X-Mms-Message-Type: m-notification-ind
X-Mms-Transaction-ID: 11
X-Mms-Version: 1.0
From: andreas.schmidt@sal.siemens.de
X-Mms-Message-Class: Personal
X-Mms-Message-Size: 4545
X-Mms-Expiry: 3600
X-Mms-Content-Location: www.server.bosch.de/mms-
inbox/BBBB.2222

X-Mms-RFF-To-Amount: 3
```

The "To recipient" 4 learns from the entry in field 17 (X-Mms-RFF-To-Amount) that the recipient is entitled to three reply MMs free of charge.

b) Message 11: M-Notification.ind to the "Cc Recipient":

```
X-Mms-Message-Type: m-notification-ind
X-Mms-Transaction-ID: 12
X-Mms-Version: 1.0
From: andreas.schmidt@sal.siemens.de
X-Mms-Message-Class: Personal
X-Mms-Message-Size: 4545
X-Mms-Expiry: 3600
X-Mms-Content-Location:
www.server.bosch.de/inbox/mms/schmidt.gunnar/BBBB.2222

X-Mms-RFF-Cc-Amount: 1
```

The "Cc recipient" learns from the entry in field 18 (X-Mms-RFF-Cc-Amount) that the recipient is entitled to one reply MM free of charge.

c) Message 11: M-Notification.ind to "Bcc Recipient 2":

```
X-Mms-Message-Type: m-notification-ind
X-Mms-Transaction-ID: 13
```

-continued

```
X-Mms-Version: 1.0
From: andreas.schmidt@sal.siemens.de
X-Mms-Message-Class: Personal
X-Mms-Message-Size: 4545
X-Mms-Expiry: 3600
X-Mms-Content-Location:   www.server.bosch.de/mms-
   inbox/default-user/1234567ABCDEFG
```

The M-Notification.ind to both the "Bcc" recipients, in this example to the second recipient 4 of this group, does not differ in relation to the prior art, because the service provider 3 rejected the request of the sender 2 to bear the costs of one reply per "Bcc" recipient.

The download of the $MM_{A\,7}$ is initiated by the WSP GET instruction 13. The data 7 is thereupon sent from the MMS relay 3 to the relevant recipient 4 in the M-Retrieve.conf message 14.

Only the "To" recipient is considered in the following.

Message 14: M-Retrieve.conf (MMS Relay 3→MMS User Agent B 4):

```
X-Mms-Message-Type: m-retrieve-conf
X-Mms-Transaction-ID: 14
Message-ID: BBBB.2222@bosch-mms.de
X-Mms-Version: 1.0
Date: Wed, 13 Sep. 2000 12:12:19 +0100
From: andreas.schmidt@sal.siemens.de
X-Mms-Message-Class: Personal
X-Nms-Message-Size: 4545
X-Mms-Expiry: 3600

X-Mms-RFF-To-Amount: 3

Subject: multimedia message i
Content-Type: multipart/related;       boundary="------
   _=_NextPart_000_"
------_=NextPart_000_
Content-Type: text/plain;
       name="meeting.txt"
Content-Transfer-Encoding: quoted-printable
Dear Colleagues,
A meeting has been scheduled at short notice for tomor-
row morning at 8 o'clock.
The agenda is attached. Please reply asap.
URGENT !!!
Regards, Andreas
------_=_NextPart_000_
Content-Type: image/jpeg; name="agenda.jpg"
Content-Transfer-Encoding: base64
Content-ID: <1725782>
...
------_=_NextPart_000_--
```

The $MM_{A\,7}$ can have a different Message-ID here; e.g., if the addressee 4 of this data 7 "belongs" to a second service provider. This is allowed for in the example, in that the value "BBBB.2222@bosch-mms.de" has been written in the field Message-ID.

As previously in the message 11 (M-notification.ind), the "To recipient" learns from the entry in the field X-Mms-RFF-To-Amount that the recipient is entitled to three reply MMs free of charge.

In accordance with the prior art, the presence of the field Message-ID is optional in the WAP message 14. However, in order to allow "Reply for free" functionality, this field must be present if one of the fields 17 (X-Mms-RFF-To-Amount), 18 (X-Mms-RFF-Cc-Amount) or 19 (X-Mms-RFF-Bcc-Amount) is present and occupied.

In the following, the To recipient 4 of the $MM_{A\,7}$ sends a reply MM, $MM_B$, back to the original sender 2. A slightly modified M-Send.req 23 is used for this purpose (FIG. 2). In this example, the first of three possible/prepaid replies (see above) is to be sent.

Message 23: M-Send.reg (MMS User Agent B→MMS Relay):

```
X-Mms-Message-Type: m-send-req
X-Mms-Transaction-ID: 20
X-Mms-Version: 1.0
Date: Wed, 13 Sep. 2000 12:45:00 +0100
From: josef.laumen@sal.siemens.de
To: andreas.schmidt@sal.siemens.de X-Mms-Reply-ID: BBBB.2222@bosch-mms.de Subject: multimedia message ii
Content-Type: multipart/related;       boundary="------
   _=_NextPart_111_"
------_=_NextPart_111_
Content-Type: text/plain;
       name="answer.txt"
Content-Transfer-Encoding: quoted-printable
Dear Andreas,
Meeting at 8 o'clock tomorrow morning is okay for me.
Regards, Josef
------_=_NextPart_111_--
```

The original recipient 4 (MMS user agent B) uses the presence of the new field 20 (X-Mms-Reply-ID) to indicate that this $MM_B$ represents a reply to a different MM. The MM to which this reply relates is determined in the field entry "BBBB.2222@bosch-mms.de" of the field 20 (X-Mms-Reply-ID). This entry is the Message-ID of the $MM_A$, as learned by MMS user agent B when downloading the $MM_{A\,7}$ with the message 14.

The send request 23 (M-Send.req) of the MMS user agent B is acknowledged via a message 24 (M-Send.conf) from the MMS relay 3. This is modified:

Message 24: M-Send.conf (MMS Relay→MMS User Agent B):

```
X-Mms-Message-Type: m-send-conf
X-Mms-Transaction-ID: 20
X-Mms-Version: 1.0
X-Mms-Response-Status: ok
Message-ID: CCCC.3333@bosch-mms.de X-Mms-RFF-To-Amount: 2
```

The MMS relay 3 can inform the MMS user agent B, via the entry "X-Mms-RFF-To-Amount: 2", that MMS user agent B can send two further cost-free replies for the same $MM_{A\,7}$.

The MMS relay 3 now informs the recipient of the $MM_B$, namely the original sender 2 of the $MM_{A\,7}$, via the WAP message 25 (M-Notification.ind):

Message 25: M-Notification.ind (MMS Relay 3→MMS User Agent A 2):

```
X-Mms-Message-Type: m-notification-ind
X-Mms-Transaction-ID: 21
X-Mms-Version: 1.0
From: joseff.laumen@sal.siemens.de
X-Mms-Message-Class: Personal
X-Mms-Nessage-Size: 4800
X-Mms-Content-Location: www.server.siemens.de/    in-
box/mms/xyz987654321

X-Mms-Reply-ID: AAAA.1111@mms-relay.siemens.de
```

This M-Notification.ind 25 is also modified, in order to inform the MMS user agent A that the present MM represents a reply MM, and to which $MM_{A\ 7}$ this reply relates.

The field 20 (X-Mms-Reply-ID) is inserted into the M-notification.ind 25 for this purpose. The field entry should be the Message-ID 1 of the $MM_{A\ 7}$ to which this reply $MM_B$ relates, in this case: "AAAA.1111@mms-relay.siemens.de". It is again important in this context that the service provider 3 (the MMS relay) is responsible for mapping ID 2 onto ID 1, in case these two are different from each other, because MMS user agent A only knows ID 1 whereas MMS user agent B only knows ID 2. The content of the fields 20 (X-MMS-Reply-ID) can be different in the messages 23 (M-Send.req) and 25 (M-notification.ind), as is the case in this example, even though the same $MM_B$ is being identified both times.

The correct receipt of this notification then can be confirmed again with the WAP message M-NotifyResp.req, because the corresponding Transaction-ID of the M-notification.ind is sent back to the MMS relay 3 together with a status report. Once again, the download of the $MM_B$ is initiated by MMS user agent A via the WSP GET instruction 26. The $MM_B$ is then sent from the MMS relay 3 to the MMS user agent A in the M-Retrieve.conf message 27:

Message 27: M-Retrieve.conf (MMS Relay→MMS User Agent A):

```
X-Mms-Message-Type: m-retrieve-conf
X-Mms-Transaction-ID: 24
Message-ID: DDDD.4444@mms-relay.siemens.de
X-Mms-Version: 1.0
Date: Wed, 13 Sep. 2000 12:45:00 +0100
From: josef.laumen@sal.siemens.de
To: andreas.schmidt@sal.siemens.de
X-Mms-Message-Class: Personal
X-Mms-Message-Size: 4800

X-Mms-Reply-ID: AAAA.1111@mms-relay.siemens.de

Subject: multimedia message ii
Content-Type: multipart/related;    boundary="------
_=_NextPart_111_"
------_=_NextPart_111_
Content-Type: text/plain;
    name="answer.txt"
Content-Transfer-Encoding: quoted-printable
Dear Andreas,
Meeting at 8 o'clock tomorrow morning is okay for me.
Regards, Josef
------_=_NextPart_111_--
```

The M-retrieve.conf 27 is also modified, in order to inform the MMS user agent A that the present $MM_B$ represents a reply MM, and to which MM this reply relates. The field 20 (X-Mms-Reply-ID) is inserted in the M-notification.ind for this purpose. The field entry should be the Message-ID 1 of the $MM_A$ to which this reply $MM_B$ relates.

A development relates to a method for the accounting of data transmission costs in a mobile radio network, wherein data is assigned at least one identification signal for the transmission costs, and this identification signal is transmitted to the recipient and/or the sender of the data. In this case, no new header field is used for conveying the time limit which has been specified by the sender in relation to a data identification signal, such as a WAP message (Wireless Application protocol), and which time limit has been preset for the sender and/or the relevant recipient of the message. Instead, in accordance with the main application, it is advantageous to use the previously existing header field X-MMS-Expiry for conveying such a time limit, within which time limit, for example, the recipient can reply free of charge to a multimedia message addressed to the recipient. This header field is already specified in WAP-209-MMS Encapsulation, Release 2000, Wireless Application Protocol; WAP Multimedia Messaging Service; Message Encapsulation; MMS Proposed SCD 1.0. In accordance with the main application, this time limit for answering or responding, which can be specified by the sender, is introduced in particular in the WAP messages M-Send.req, M-Notification.ind and M-Retrieve.conf. The period of validity which is encoded in the relevant header field, which already has been implemented for a multimedia message, is therefore simultaneously used to indicate the time limit within which the recipient of a multimedia message can reply to this message free of charge. This use of previously existing header fields, which are assigned to the relevant data identification signal, is particularly efficient and appropriate. However, it can lead to problems in conveying the time limit specified by the sender if the previously existing header fields are already occupied by other data records.

This problem is advantageously solved by adding at least one additional header field to the relevant identification signal, in which header field a time limit is set for responding to the identification signal.

The configuration is thus largely established for reliably conveying in an easy manner the relevant response period which has been set for a data identification signal which has been sent, having regard to a multiplicity of practical considerations.

As an alternative, at least one new header field is introduced for conveying in the relevant data identification signal the time limit specified by the sender. In particular, the WAP messages M-send.req, M-Notification.ind and M-Retrieve-.conf are extended by at least one further header field in each case. These can have the name X-Mms-Reply-deadline, for example. They are appropriately assigned the hectardecimal [sic] encoding 0x1F (decimal:127). The field values of this header field are preferably encoded in accordance with WAP-209-MMS Encapsulation, Release 2000; Wireless Application Protocol; WAP Multimedia Messaging Service; Message Encapsulation; MMS Proposed SCD 1.0 and WAP-203-WSP, Version 4-May-2000; Wireless Application Protocol, Wireless Session Protocol Specification; Chapter 8.4: "Header Encoding". In this way, an explicit date or a specific duration can be specified for the time limit. An additional header field of this type preferably has the following layout:

X-Mms-Reply-Deadline(0x1F):

Reply Deadline Value=Value length (Absolute-token Date-value/Relative-token Delta-seconds-value)

absolute–token=<octet 128> relative–token=<octet 129>

Furthermore, the sender of a reply multimedia message also should be able, independently of the selected accounting model (e.g., reply charging), to identify as a reply the sender's reply to a previously received multimedia message. For this purpose, it is likewise appropriate to introduce at least one further header field which is analogous to the header field "X-MMS-Reply-ID", in which can be written the Message-ID of the original multimedia message to which the reply relates.

Although the present invention has been described with reference to specific embodiments, those of skill in the art will recognize that changes may be made thereto without departing from the spirit and scope of the present invention as set forth in the hereafter appended claims.

The invention claimed is:

1. A method for accounting of data transmission costs for transmitting multimedia messages in a mobile radio network, the method comprising the steps of:
   assigning data of a multimedia message, which is one of transmitted and to be transmitted, at least one cost signal for costs of sending at least one reply relating to the data of the multimedia message; and
   transmitting the at least one cost signal to a recipient of the data;
   wherein at least one cost signal contains information about an assumption of costs, by an original sender of the data, with respect to the at least one reply, the at least one cost signal includes identification information for the data for allowing assignment of at least one reply to the data, and the at least one cost signal is assigned at least one header field of the transmitted data of the multimedia message.

2. A method for accounting of data transmission costs for transmitting multimedia messages in a mobile radio network as claimed in claim 1, wherein the at least one cost signal specifies a time duration within which a reply to the transmitted data can be submitted free of charge by the original recipient.

3. A method for accounting of data transmission costs for transmitting multimedia messages in a mobile radio network as claimed in claim 1, wherein the at least one cost signal specifies a number of replies which can be given to the transmitted data free of charge by the original recipient.

4. A method for accounting of data transmission costs of transmitting multi-media messages in a mobile radio network as claimed in claim 1, wherein different cost signals are assigned to respective data messages by the data sender if data is transmitted to a plurality of recipients.

5. A method for accounting of data transmission costs for transmitting multimedia messages in a mobile radio network as claimed in claim 4, wherein the difference between the at least one cost signal relates to at least one of a readiness to assume costs of a reply, a time duration of the readiness, and a number of permitted cost free replies.

6. A method for accounting of data transmission costs for transmitting multimedia messages in a mobile radio network as claimed in claim 1, wherein the information in the at least one cost signal is indicated to the recipient at a time which is one of during and after receipt of the data.

7. A method for accounting of data transmission costs for transmitting multimedia messages in a mobile radio network as claimed in claim 6, wherein the information in the at least one cost signal is indicated to the recipient in a manner which is one of visual and acoustic.

8. A method for accounting of data transmission costs for transmitting multimedia messages in a mobile radio network as claimed in claim 1, wherein the method is applied in a Mobile Messaging Service.

9. A method for accounting of data transmission costs for transmitting multimedia messages in a mobile radio network as claimed in claim 1, wherein the method is applied in a system which is at least one of UMTS, GSM, GPRS and EDGE.

10. A method for accounting of data transmission costs for transmitting multimedia messages in a mobile radio network as claimed in claim 1, wherein a readiness to assume the costs of the at least one reply is stored in a header field and a time duration of the readiness to assume the costs is stored in a further header field.

11. A method for accounting of data transmission costs for transmitting multimedia messages in a mobile radio network as claimed in claim 10, wherein the at least one cost signal is stored in header fields 0X1B to 0x1E.

12. A method for accounting of data transmission costs for transmitting multimedia messages in a mobile radio network as claimed in claim 1, wherein the at least one cost signal is transmitted respectively during transmission of a multimedia message data record from the sender to a multimedia messaging service relay of a service provider, in a confirmation of receipt of the transmitted multimedia data record, in a notification to the recipient by the multimedia messaging service relay of the service provider concerning a presence of a new multimedia data record, as well as during transmission of a multimedia reply from the recipient of the original data to the multimedia messaging service relay of the service provider, and when notifying the original sender of a presence of the multimedia reply from the original recipient.

13. A method for accounting of data transmission costs for transmitting multimedia messages in a mobile radio network as claimed in claim 1, wherein additional header fields are assigned to messages M-send.req, M-send.conf, M-Notification.ind and M-Retrieve.conf in each case.

14. A method for accounting of data transmission costs for transmitting multimedia messages in a mobile radio network as claimed in claim 13, wherein the outgoing message M-send.req is assigned an additional header field for an option by the sender of assuming costs of at least one reply to the data to be sent by the sender, and an additional header field for determining a time duration of a readiness to assume the costs.

15. A method for accounting of data transmission costs for transmitting multimedia messages in a mobile radio network as claimed in claim 14, wherein the message M-send.conf return to the data sender by a provider includes a header field containing confirmation of one of acceptance and partial rejection of the assumption of costs of the at least one reply, and a header field containing information about the costs which the data sender can expect to incur.

16. A method for accounting of data transmission costs for transmitting multimedia messages in a mobile radio network as claimed in claim 13, wherein the message M-Notification.ind sent to the recipient by the provider includes at least one header field containing a signal which indicates the assumption of costs and, if appropriate, which specifies a limit to at least one of a time duration and a number of replies.

17. A method for accounting of data transmission costs for transmitting multimedia messages in a mobile radio network as claimed in claim 13, wherein an answer sent to the provider by the recipient contains an indicator that it is a reply to data which has been sent, and an identification information indicating the data concerned.

18. A method for accounting of data transmission costs for transmitting multimedia messages in a mobile radio network as claimed in claim 13, wherein the notification to the original sender contains information indicating that the message available for receipt is a reply, and identification information indicating the data concerned.

19. A method for accounting of data transmission costs for transmitting multimedia messages in a mobile radio network as claimed in claim 1, wherein at least one additional header field is assigned to the identification signal in each case, in which field a time limit for responding is set on the identification signal.

20. A mobile telecommunication device for accounting of data transmission costs for transmitting multimedia messages in a mobile radio network, comprising:
- parts for assigning data of a multimedia message, which is one of transmitted and to be transmitted, at least one cost signal for costs of sending at least one reply relating to the data of the multimedia message; and
- parts for transmitting the at least one cost signal to a recipient of the data;
- wherein the at least one cost signal contains information about an assumption of costs, by an original sender of the data, in respect of the at least one reply, the at least one cost signal includes identification information for the data in order to allow assignment of at least one reply to the data, and the at least one cost signal is assigned at least one header field of the transmitted data of the multimedia message.

21. A mobile telecommunication device as claimed in claim 20, further comprising an assumption switch for permitting an assumption of costs of the at least one reply.

22. A mobile telecommunication device as claimed in claim 21, further comprising an indicator for indicating the assumption of costs of the at least one reply and for a duration of the assumption of costs.

23. A mobile telecommunication device as claimed in claim 22, wherein the indicator indicates the assumption of costs in a manner which is one of visual and acoustic.

24. A mobile telecommunication device as claimed in claim 21, wherein the assumption switching is implemented in software and is selectable via an input.

25. A mobile telecommunication device as claimed in claim 20, wherein the telecommunication device is assigned software for entering a cost signal, for an assumption of costs of the at least one reply, into header fields of data messages.

* * * * *